United States Patent
Fiocco

[15] 3,645,398
[45] Feb. 29, 1972

[54] COALESCER CARTRIDGE AND COALESCER FOR OILY WATER
[72] Inventor: Robert J. Fiocco, Summit, N.J.
[73] Assignee: Esso Research and Engineering, Company
[22] Filed: July 24, 1969
[21] Appl. No.: 844,297

[52] U.S. Cl.................................210/73, 219/84, 219/307, 219/489, 210/DIG. 5
[51] Int. Cl.........................................................B01d 21/10
[58] Field of Search.................210/73, 83, 84, 307, 489–491, 210/494

[56] References Cited

UNITED STATES PATENTS

| | | | |
|---|---|---|---|
| 3,228,527 | 1/1966 | McPherson | 210/307 |
| 3,229,817 | 1/1966 | Pall | 210/DIG. 5 |
| 3,256,997 | 6/1966 | Pall et al. | 210/494 |
| 3,417,015 | 12/1968 | Canevari et al. | 210/73 X |

*Primary Examiner*—John Adee
*Attorney*—Manahan and Wright and Donald F. Wohlers

[57] ABSTRACT

A replaceable coalescing cartridge, capable of use in any commercial coalescer, comprising an upstream coalescing section and a downstream bubble breaking section, transforms small diameter oil droplets into larger droplets without the formation of oil surfaced water bubbles. A coalescer, fitted with said cartridge, employing a honeycomb of curve-shaped settling ducts is provided.

10 Claims, 13 Drawing Figures

R.J. Fiocco INVENTOR

BY Donald F. Wohlers ATTORNEY

R.J. Fiocco  INVENTOR

COALESCER CARTRIDGE AND COALESCER FOR OILY WATER

BACKGROUND OF THE DISCLOSURE

In various industrial operations, efflux streams are obtained which comprise water containing a relative minute amount of oil in finely dispersed form. These finely dispersed oil droplets are not readily subject to gravity separation and are characteristic of effluxes from conventional gravity separators. For example, it is not uncommon that the water flowing from a gravity separation system contains well over 200 parts per million of oil, whereas it may be desirable or necessary to meet government or international regulations that the water efflux to rivers or oceans have an oil content of less than, say, 100 p.p.m.

The removal of these last small and minute quantities of dispersed oil in suspension without incurring excessive cost has heretofore presented a difficult problem to the oil refiner.

In the prior art, coalescing cartridges have been advanced in combination with various settling units to remove these small dispersed oil suspensions. Among the most recent is the cartridge disclosed in U.S. Pat. No. 3,417,015. This patent discloses a cartridge comprising an open sandwiched upstream coalescing section and a downstream bubble breaking section. The upstream portion is a loose spiral wrapped cylinder of a lipophilic material. The downstream bubble breaker portion of the cartridge comprised a cylindrical, dislike spiral array of pointed wires. Although this prior art cartridge was a significant advance in the art, it suffers from certain defects which are not present in the instant invention.

A lipophilic coalescing cylinder, which is the most effective material for coalescing and collecting oil, has a tendency to accentuate the formation of oil surfaced water bubbles. Although many pointed wires are provided in the bubble breaker to break oil surfaced water bubbles these wires are disposed in a disclike pattern. Thus, there are portions of bubble breaker surface area not provided with bubble breaking means so that some oil surfaced water bubbles may get through without being ruptured. Also, since these wires are metallic, they suffer from the life shortening effects of corrosion.

In U.S. Pat. No. 3,417,015 a settling unit similar to the one disclosed in the instant invention is provided. In that patent a honeycomb of narrow conduits is provided by a crisscrossed plurality of plastic walls. Although this arrangement is a significant improvement over the art before it, it is subject to structural defects under certain conditions when used for long periods of time. The instant invention, because of its metal construction in a preferred embodiment, not only cures this defect but, in addition, provides easier installation.

It is, therefore, the principle object of the present invention to increase the efficiency of prior art separators. A second object of the present invention is to provide a unit though small in size that can remove these last small and minute quantities of dispersed oil in suspension without incurring excessive costs that have heretofore presented a difficult problem to the oil refiner.

SUMMARY OF THE INVENTION

The present invention includes a coalescing cartridge comprising an upstream lipophilic section and a downstream hydrophilic section. The upstream section of the cartridge includes a lipophilic web of fibers which may or may not be coated with a lipophilic binder. A binder is provided for the purpose of improving the mechanical strength of the cartridge or to provide a lipophilic surface where the fibers used are themselves hydrophilic. Alternately, the binder may provide both of these functions. This upstream lipophilic section of the cartridge permits maximum droplet growth of the finely dispersed oil droplets that flow therein.

The hydrophilic section of the cartridge, disposed downstream of the coalescing upstream section, comprises another web of randomly disposed hydrophilic fibers which may or may not be coated with a hydrophilic binder. The binder in this case is provided to impart mechanical strength to the web only, since the fibers used are always hydrophilic. The downstream hydrophilic section of the cartridge serves to rupture large, oil surfaced, water bubbles which may form on the discharge side of the upstream coalescing section.

The combined cartridge comprising both upstream and downstream sections is put together in a form so that it may be installed in any commercial separator or coalescer. It therefore serves to increase the efficiency of any separator, in that it provides a means for coalescing finely dispersed oil droplets which themselves may not be separable in the coalescer without this cartridge.

This cartridge has particular application to the settling chamber of the instant invention. This chamber extends horizontally and includes a plurality of relatively small curve-shaped area passageways or ducts. As any single droplet that enters the inlet end of a particular duct is carried to the opposite end of that duct, it will rise due to gravity separation and collect upon the upper surface of the curve-shaped duct. Because the cross-sectioned area of this duct is relatively small, any one particular oil droplet will rise out of the water stream and stick to a surface sooner than would be the case had the construction required an oil droplet to rise from the lower portion of the settling tank all the way to the top thereof. These small cross-sectional area passageways of the settling chamber also function to prevent turbulent flow at high flow rate in the gravity settling chamber. Obviously, it is highly desirable to prevent turbulent flow in an area where gravity separation is to occur.

At the discharge end of each of the passageways, the oil collected on the upper duct surfaces is transferred to an inclined plate coplanar with the upper wall of each of the ducts. The terminal edge of this extending plate portion is divided with an oil-arresting lip which prevents further horizontal flow of the collected oil while permitting the continued horizontal flow of the primary water stream. Each of the inclined plate portions is effective to direct the oil film on the underside thereof obliquely upward to the adjacent outer wall of the settling chamber casing along which it rises gradually to an upper oil collection trap.

DETAILED DESCRIPTION

Figure 1:
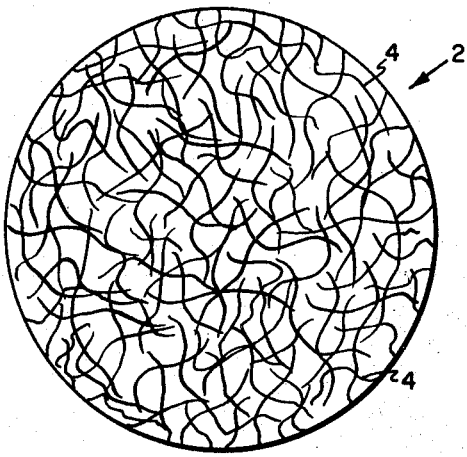
FIG. 1 is an end view of the upstream section of the coalescing cartridge.

Referring specifically to FIG. 1, the upstream coalescing section of the coalescing cartridge of the instant invention is depicted generally at 2. The cartridge comprises a web of randomly dispersed fiber 4, closely packed together in a cylindrical shape. In a preferred embodiment, the fibers are polypropylene. Since polypropylene fibers are lipophilic, there is no need to add a lipophilic binder to coalesce finely dispersed oil droplets and in a preferred embodiment none is added. However, in another preferred embodiment the randomly dispersed fibers are stiffened to provide protection against structural failure by addition of a plastic coating. In this embodiment, the coating or binder is a lipophilic material such as an alkyl amine, acrylic or phenolic resin. In still another preferred embodiment glass fibers are employed. Since fiberglass is hydrophilic a lipophilic coating is necessary not only for structural strength but in order for the upstream section to function as an oil coalescer. In such a case, an alkyl amine, an acrylic or a phenolic resin binder is always added to the fibers. The binder represents 7 to 18 percent by weight of the total weight of the upstream cartridge in the case where fiberglass is employed. This results in a bulk density of from 1 to 3 pounds per cubic foot. In a preferred embodiment fiberglass with a diameter of 3 to 7 microns is employed. In all embodiments the upstream cartridge is about 1 to 3 inches thick.

Figure 2:
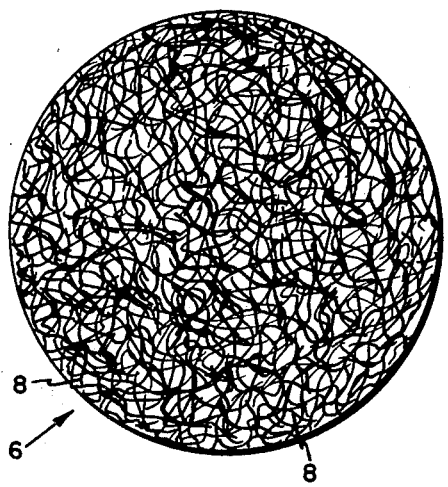
FIG. 2 is an end view of the downstream section of the coalescing cartridge.

Turning now to FIG. 2, the downstream hydrophilic section of the cartridge is denoted generally at 6. It comprises a web of randomly dispersed fibers 8 which may or may not be coated with a hydrophilic binder. The fibers employed in this downstream section are hydrophilic fiberglass fibers which may or may not be coated with a hydrophilic agent. Again, if a hydrophilic coating is employed, its function is to strengthen the cartridge section. In either case, the function of the downstream cartridge is the same; that is, the rupture of oil surfaced water bubbles which may form on the discharge side of the upstream section of the cartridge 2. Both embodiments result in a downstream section of the cartridge which is approximately 1 to 3 inches thick. In each case coarse grade fiberglass (1.2 to 1.5 microinches in diameter) is used. In the case of an untreated fiberglass web, the web is packed to a bulk density of about 17.5 pounds per cubic foot.

Figure 3A:
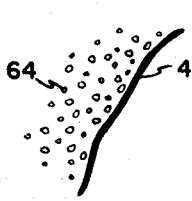
FIGS. 3a, 3b and 3c show the coalescing operation of a strand of fiber of the upstream section of the coalescing cartridge.
Figure 3B:
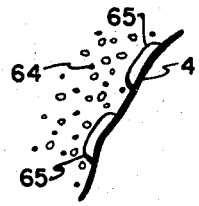
Figure 3C:
Figure 4:
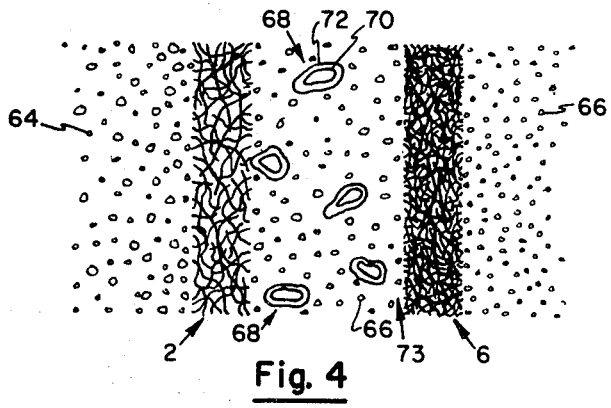
FIG. 4 is an exploded, diagrammatic view of the upstream and downstream sections of the cartridge schematically showing the operation of the bubble severing means of the downstream section.

The operation of the cartridge can best be explained by turning to FIGS. 3 through 5. In FIGS. 3a through 3c an individual fiber 4 of the upstream section of the cartridge of the instant invention is shown. A plurality of fine oil droplets 64 approach the fiber strand 4 in FIG. 3a. In FIG. 3b these fine oil droplets 64 gradually accumulate on the periphery of the fiber 4 and form an oil film 65. As this oil film or layer 65 grows to a sufficient thickness and size, a plurality of droplets 66, larger than the droplets 64 will be broken off from the downstream portion thereof. The larger size droplets 66 are more readily gravity separated than the fine droplets 64 in the incoming feed. This is shown in FIG. 3c wherein the larger size oil droplets 66 are shown discharging from the film 65 accumulated on fiber 4.

In FIG. 4, a preferred embodiment of the cartridge of the instant invention is depicted in an exploded, diagrammatic view. It shows a separation 73 between the upstream web 2 and the downstream web 6; however it is not necessary to provide a separation between web 2 and web 6. FIG. 4 depicts the action and effect of the downstream bubble breaking section 6 of the cartridge. As shown therein, a multiplicity of finely dispersed oil droplets 64 approach the upstream section of the lipophilic web 2. Since the lipophilic web 2 has a strong affinity for the oil, the oil droplets easily stick to the surface and become enlarged as additional oil deposits on the web. The droplets are enlarged on the lipophilic web 2 as described above in FIG. 3. Because of the strong affinity between the oil and the web, a plurality of large diameter, oil surfaced water bubbles 68 form in addition to the multiplicity of large oil droplets 66. These oil surfaced water bubbles 68 have a center portion 70 of water and a very thin oil film outer layer 72. These are extremely difficult to remove by gravity separation because of their low settling velocity. The downstream hydrophilic web 6 is effective to rupture these undesirable bubbles 68. Thus, only enlarged oil droplets 66 which are much more amenable to gravity separation flow out of the downstream edge of the hydrophilic web 6.

Figure 5A:
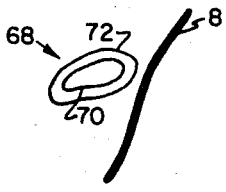
FIGS. 5a, 5b and 5c show the bubble severing operation of a strand of fiber of the downstream section of the coalescing cartridge.
Figure 5B:
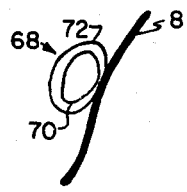
Figure 5C:
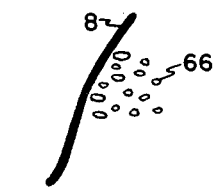

The mechanism by which the downstream web 6 ruptures objectionable oil surfaced water bubbles 68 is illustrated in FIG. 5. In FIG. 5a, an oil surfaced water bubble 68 approaches a fiber 8 of the hydrophilic web 6. In FIG. 5b, the bubble is ruptured by the hydrophilic surface of the fiber 8. Since the hydrophilic fibers have very little affinity for the oil, the outer edge of bubble 68 which is the oil portion 72, slips off the hydrophilic fiber and flows downstream as single component oil droplets 66, of approximately the same diameter as those bubbles 66 formed downstream of web 2. This phenomena is illustrated in FIG. 5c.

Figure 6:
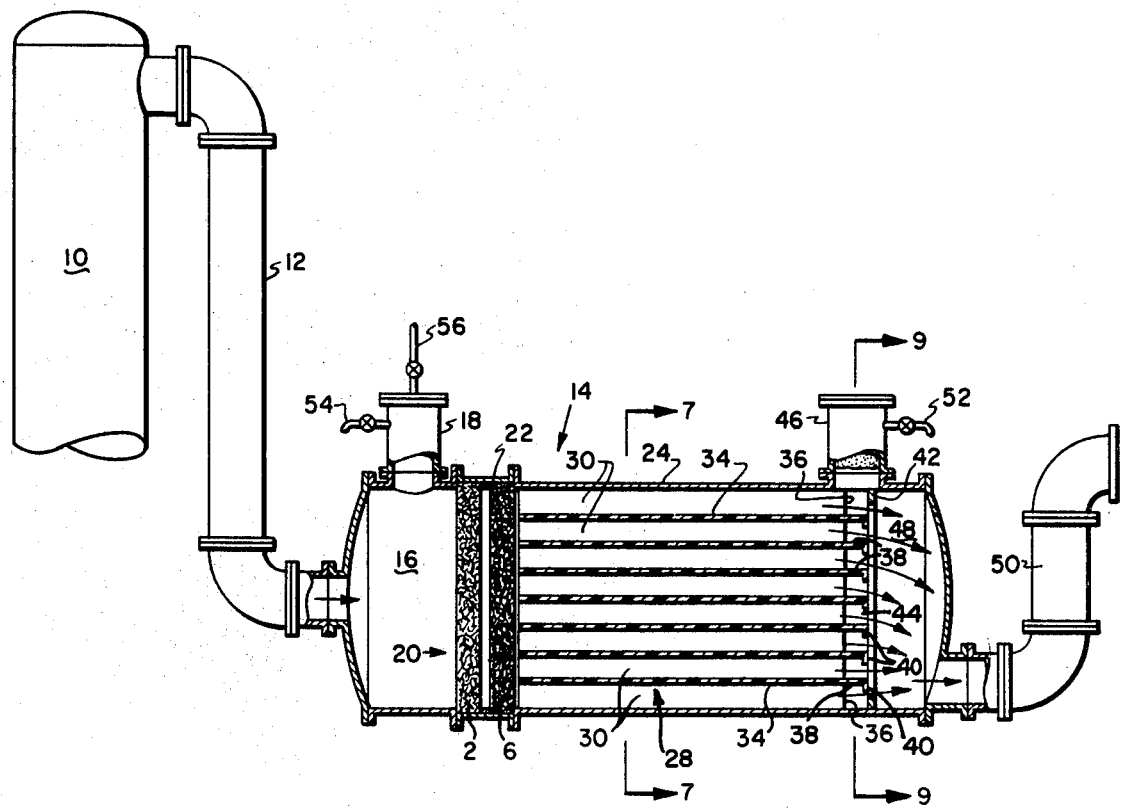
FIG. 6 is a side elevation view of the coalescing cartridge and the settling chamber of the instant invention, showing portions thereof in cross sections.

Turning now to a detailed description of the separator of the instant invention, reference is made to FIG. 6. FIG. 6 is a side elevation view of the separator showing portions thereof in cross section. A preliminary gravity separator 10 is shown fragmentarily discharging through a conduit 12 into an inlet chamber 16 of the separator unit generally indicated at 14. It will be appreciated that the preliminary separator 10, while performing an initial rough cut separation, is not necessary for the operation of applicant's invention where an inlet stream is provided having a relatively low amount of oil content therein. However, applicant's high efficiency separator is particularly suitable for increasing the ultimate discharge performance of prior art separators, such as the one schematically illustrated at 10, which do not produce results compatible with many government established clean water standards.

Figure 7:
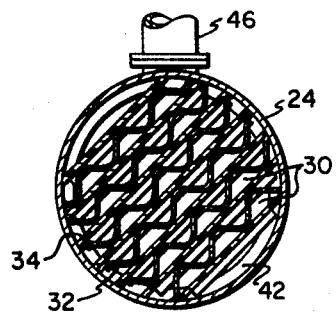
FIG. 7 is a cross section view taken along line 7—7 of FIG. 6 showing the passageways in greatly enlarged scale.
Figure 8:
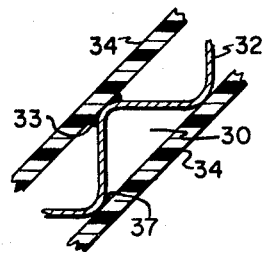
FIG. 8 is an exploded view of a portion of FIG. 7 showing the cooperation between the corrugated and wall members to form a plurality of parabolic passageways.

The liquid stream entering the inlet chamber 16 is understood to carry the majority of its oil content in finely dispersed small droplets which do not readily lend themselves to gravity separation even over long settling periods. However, in instances where an occasional large slug of oil enters the chamber 16 or where air bubbles may be introduced therein, they may readily rise to the top of chamber 16 into an air accumulation trap 18. One side of the chamber 16 is defined by a coalescing cartridge indicated generally at 20. The cartridge 20 is the coalescing cartridge described above. Therefore, it includes an upstream lipophilic section denoted generally at 2 and a downstream hydrophilic section denoted generally at 6. The cartridge is maintained within the casing of the separator unit by means of flange 22. Flange means 22 is used to hold the cartridge in the separator unit for ease of replacement of this replaceable coalescing cartridge 20. Adjacent and downstream of the hydrophilic bubble rupture in web 6, a settling chamber 28 is provided with a plurality of elongated, horizontally extending ducts 30 which serve to improve the performance of the settling chamber. The ducts 30 of FIG. 7 are shown in enlarged cross-sectional scale for purposes of illustration. However, it should be understood that in a preferred embodiment of the separator unit, the ducts are approximately 1 square inch in cross-sectional area, while the diameter of the casing for the settling unit may be approximately 4 feet. As may be seen in FIGS. 7 and 8, the ducts are defined by a corrugated member 32 and top wall member 34. The corrugated member 32 is welded to the top wall member 34 at their points of intersection 33. It should be noted that member 32 is not welded to the top wall member 34 below member 32. Thus, there is no weld at point 37 in FIG. 8. The top wall portion 34 and the corrugated member 32 cooperate to form a generally parabolic or sinusoidally shaped passageway which extends horizontally across the settling chamber to a point where the corrugated members 32 terminate along a downstream edge designated 36. In a preferred embodiment the corrugated member is comprised of stainless steel sheet metal approximately 0.031-inch thick. In alternate embodiments aluminum or polypropylene is used instead of stainless steel. Depending on the application the relative advantages of lighter weight, corrosion resistance and service life are considered n determining the material of construction of member 32.

Figure 9:
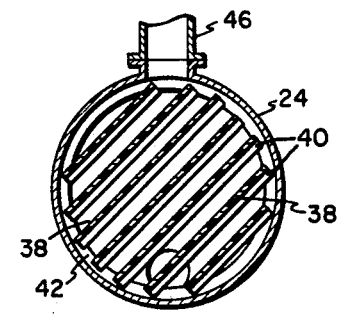
FIG. 9 is a cross section view similar to FIG. 7 taken along line 9—9 of FIG. 6.

Referring now to FIG. 9, as well as FIGS. 6 and 7, it can be seen that the top wall portion 34 of each duct 30 extends horizontally beyond the terminal edge 36 of the corrugated wall members 32 to create an overhanging portion or ledge 38. Each of the overhanging portions 38 includes a downwardly projecting oil-arresting lip 40 which is effective to prevent further horizontal flow of the oil accumulation moving along the upper, underneath side of each of the top walls 34. In FIG. 9 it should be noted that the width of each of the extending portions 38 is slightly less than the internal dimension of the cylindrical casing of the unit. This permits the separated oil that flows from the end of each individual duct 30 to travel upwardly along the inclined underside of the overhanging portion 38 into an annular oil collection chamber 44. This oil collection chamber 44 is defined at its downstream edge by an annular ring 42. The oil flowing off the uppermost edges of the overhanging portions 38 rise upwardly to the inside surface of the casing 24 and progresses upwardly into the oil trap portion 46. The oil trap 46 is provided with a suitable oil outlet tap 52 while the air accumulation trap 18 is provided with a similar oil trap 54 and an upper located air vent 56. The flowing stream of water emitted from the respective ends of each of the ducts 30 traverses the underside of each of the depending lips 40 into an outlet chamber 48 which communicates through a lower portion thereof into a water outlet conduit 50.

Although the above disclosure has been directed to the separation of oil bubbles from a water stream, this invention is not limited to these components. Thus, any combination of liquid phases where one is nonpolar and immiscible and a second which is polar may be employed. Hence, any nonpolar hydrocarbon may be separated from any immiscible polar liquid such as water-miscible alcohols, e.g., methanol, glycerol, ethylene glycol, etc., in addition to water. Furthermore, if it were desirable to remove water droplets from oil the coalescing cartridge would be reversed, that is, the hydrophilic web would be the upstream portion and the lipophilic web would be the downstream portion.

EXAMPLE

A 10-inch diameter experimental separator unit employing the coalescer cartridge of the instant invention and the corrugated duct arrangement of the instant invention was tested for oil efficiency. The cartridge comprised a phenolic coated fiberglass lipophilic web and a downstream hydrophilic web comprising glass fibers. The results of this test as a function of time are tabulated in Table I, below:

TABLE I

| Elapsed time, Hours | Influent oil content, p.p.m. | Effluent oil content, p.p.m. | Percent Removal |
| --- | --- | --- | --- |
| 0.25 | 74 | 12 | 84 |
| 0.50 | 97 | 13 | 87 |
| 0.75 | 60 | 11 | 82 |
| 1.25 | 69 | 12 | 83 |
| 1.75 | 88 | 13 | 85 |
| 2.25 | 122 | 12 | 90 |
| 2.75 | 92 | 15 | 84 |
| 3.25 | 111 | 19 | 83 |
| 3.75 | 132 | 14 | 89 |
| 4.25 | 194 | 14 | 93 |
| 4.75 | 270 | 16 | 94 |
| 5.25 | 291 | 16 | 95 |
| 5.75 | 172 | 17 | 90 |
| 6.25 | 235 | 16 | 93 |
| 6.75 | 210 | 17 | 92 |
| 7.25 | 225 | 21 | 91 |
| 7.75 | 201 | 17 | 92 |
| 8.00 | 112 | 17 | 85 |

What is claimed is:

1. In an apparatus for separating dispersed fine droplets of a first liquid from a flowing stream of a second liquid which is of different density than and immiscible with the first liquid, comprising, in combination: coalescing means including an upstream bed of fibers for coalescing said fine droplets of the first liquid into a first plurality larger size droplets more readily susceptible to subsequent gravity separation, and bubble breaking means spaced downstream from said bed of fibers producing a second plurality of larger size droplets of said first liquid on the discharge side thereof for subsequent gravity separation; and a settling chamber connected to receive the mixture of said first and second plurality of said larger size droplets of first liquid and said second liquid emerging from said coalescing means, said settling chamber including an outer casing member, wall means defining a plurality of elongated contiguous passageways extending horizontally through said casing member, each of said passageways acting as a preliminary settling chamber and at least one wall thereof acting as an additional coalescing surface for said larger size droplets, a plurality of plate means at the discharge end of said passageways for collecting and directing the gravity separated and further coalesced larger size droplets emerging from the discharge end of each of said passageways to the inner wall of said casing, each of said plate means having a lip portion extending transverse to the horizontal fluid flow for arresting further horizontal flow of said first liquid while permitting substantially uninterrupted continued horizontal flow of the second liquid, and means connected to said casing member for receiving the collected first liquid; the improvement comprising, said bubble breaking means comprising a hydrophilic web of randomly dispersed fibers for breaking substantially all of said first liquid surfaced second liquid bubbles forming on the discharge side of said bed of fibers and forming on its discharge side a second plurality of larger size droplets of said first liquid, said hydrophilic web permitting said first and second plurality of larger size droplets to pass therethrough and discharge from the downstream side thereof.

2. The coalescing means of claim 1 wherein said hydrophilic web of randomly dispersed fibers is disposed in spaced relation relative to said bed of fibers.

3. The coalescing means of claim 1 wherein said bed of fibers comprises a web of alkylamine-coated fiberglass fibers.

4. The coalescing means of claim 1 wherein said bed of fibers comprises a web of fiberglass fibers supported by a binder selected from the group consisting of acrylic and phenolic resins.

5. The coalescing means of claim 1 wherein said bed of fibers comprises a web of polypropylene.

6. The coalescing means of claim 1 wherein said hydrophilic web comprises fiberglass fibers.

7. The coalescing means of claim 6 wherein said fiberglass fibers have a coating of a hydrophilic binder.

8. The coalescing means of claim 1 wherein said hydrophilic web is disposed contiguous to said bed of fibers on the discharge side of the latter.

9. The coalescing means of claim 1 wherein said hydrophilic web produces a second plurality of larger size droplets of said first liquid which are substantially the same size as said first plurality of larger size droplets of said first liquid.

10. The method for separating a mixture of dispersed fine droplets of oil from a flowing stream of water comprising the steps of (1) passing the mixture through a lipophilic web of a coalescing medium to produce larger size droplets of oil; (2) passing said mixture including said larger size droplets and larger sized oil-surface bubbles of water emerging from the downstream side of said lipophilic web through a hydrophilic web of said coalescing medium; (3) breaking said larger sized oil-surfaced bubbles of water in said lipophilic web to form a second plurality of larger size droplets of oil on the discharge side of said hydrophilic web; (4) passing said mixture including said first and second plurality of larger size droplets of oil through a plurality of parallel horizontal contiguously disposed ducts which act to prevent turbulent flow at high flow rates of said stream; (5) further coalescing and separating by gravity said oil droplets on the surfaces of said ducts as said flowing stream moves horizontally through said ducts; (6) moving the coalesced oil droplets horizontally from one end of each duct to its opposite end; (7) intercepting the horizontally flowing coalesced oil droplets as they leave the discharge end of each of said ducts and directing the coalesced and preliminary gravity separated oil transversely from the end of the duct and upwardly therefrom to a final gravity separation chamber; and (8) continuing the flow of water in a horizontal direction outwardly from the end of said ducts.

* * * * *